(12) United States Patent
Hongo et al.

(10) Patent No.: US 11,731,821 B2
(45) Date of Patent: Aug. 22, 2023

(54) FILM AND POUCH

(71) Applicant: Toyo Seikan Co., Ltd., Tokyo (JP)

(72) Inventors: Masahiro Hongo, Yokohama (JP); Shie Matsunaga, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 120 days.

(21) Appl. No.: 17/348,195

(22) Filed: Jun. 15, 2021

(65) Prior Publication Data

US 2021/0309430 A1    Oct. 7, 2021

Related U.S. Application Data

(63) Continuation of application No. PCT/JP2019/045053, filed on Nov. 18, 2019.

(30) Foreign Application Priority Data

Dec. 17, 2018 (JP) ................................. 2018-235410

(51) Int. Cl.
| | |
|---|---|
| *B65D 75/26* | (2006.01) |
| *B32B 27/08* | (2006.01) |
| *B65D 75/20* | (2006.01) |
| *B65D 75/58* | (2006.01) |

(52) U.S. Cl.
CPC .............. *B65D 75/26* (2013.01); *B32B 27/08* (2013.01); *B65D 75/20* (2013.01); *B65D 75/5827* (2013.01); *B32B 2307/732* (2013.01)

(58) Field of Classification Search
CPC .......................... B32B 27/08; B32B 2307/732
See application file for complete search history.

(56) References Cited

U.S. PATENT DOCUMENTS

| | | | |
|---|---|---|---|
| 2005/0123724 A1* | 6/2005 | Blanchard | ......... B29C 66/83413 428/156 |
| 2005/0233102 A1 | 10/2005 | Kagawa et al. | |
| 2013/0129852 A1 | 5/2013 | Kagawa et al. | |
| 2016/0200501 A1 | 7/2016 | Lee et al. | |

FOREIGN PATENT DOCUMENTS

| | | |
|---|---|---|
| CN | 1757572 A | 4/2006 |
| CN | 103121548 A | 5/2013 |
| EP | 3360662 A1 | 8/2018 |

(Continued)

OTHER PUBLICATIONS

English machine translation of JP2016-506783A. (Year: 2016).*

(Continued)

*Primary Examiner* — Michael C Miggins
(74) *Attorney, Agent, or Firm* — WHDA, LLP

(57) ABSTRACT

An object of the present invention is to provide a film and a pouch having basic characteristics such as a strength and barrier properties and achieving good openability. A film (10) according to the present invention includes at least a sealant layer (11), the film is formed with a cut guide line (G), and the cut guide line includes an impression (11A) formed in a surface of the sealant layer. In a pouch (30), the films are superimposed in a state where the sealant layers face each other, and peripheral edge parts are heat-sealed. The cut guide line is placed extending across at least a position where heat seal is not performed.

5 Claims, 16 Drawing Sheets

(56) References Cited

FOREIGN PATENT DOCUMENTS

| GB | 2533075 A | 6/2016 |
|---|---|---|
| JP | 2003-84551 A | 3/2003 |
| JP | 2006-206141 A | 8/2006 |
| JP | 2012-46231 A | 3/2012 |
| JP | 2012-162294 A | 8/2012 |
| JP | 2013-252630 A | 12/2013 |
| JP | 2016-117525 A | 6/2016 |
| JP | 2017-149463 A | 8/2017 |
| JP | 2018-171759 A | 11/2018 |

OTHER PUBLICATIONS

Jiang, Gu, Flexible packaging materials and lamination technology, Jan. 31, 2008, p. 70-76; CN Office Action dated May 18, 2022.
Wang, Jianqing et al.. Packaging Material Science, Feb. 28, 2017, pp. 98-99; CN Office Action dated May 18, 2022.
Sun, Bin, Paper packaging construction design, Aug. 31, 2015, p. 76-177; CN Office Action dated May 18, 2022.
Office Action dated May 18, 2022, issued in counterpart CN Application No. 201980081239.7, with English Translation. (42 pages).
International Search Report dated Feb. 4, 2020, issued in counterpart application No. PCT/JP2019/045053, w/English translation (4 pages).
Office Action dated Jan. 10, 2023, issued in counterpart JP application No. 2018-235410, with English translation. (6 pages).
Chen, Wenge, Flexographic Printing Technology, Aug. 30, 2010. pp. 132-133. CN Office Action dated Oct. 9, 2022.
Wu, Yanfen, Postpress Processing Technology, Jan. 31, 2008, p. 24-27. CN Office Action dated Oct. 9, 2022.
Office Action dated Oct. 9, 2022, issued in counterpart CN application No. 201980081239.7.
The Extended European Search Report dated Jan. 20, 2023, issued in counterpart to EP Application No. 19899154.9. (9 pages).

* cited by examiner

FILM AND POUCH

TECHNICAL FIELD

The present invention relates to a film formed with a cut guide line and relates also to a pouch in which the films are superimposed and peripheral edge parts are heat-sealed.

BACKGROUND ART

In the related art, as a pouch formed of resin films, there is known a pouch that is subjected to processing so that a user can open the pouch by hand without using scissors or the like to take out contents in the pouch.

An example of such processing includes processing in which a device provided with a roller pair including a cutting roller formed with a blade on a peripheral edge and a receiving roller facing the cutting roller is used and each of the films is passed between the roller pair to form a cut line in the film. Specifically, examples of the processing include processing in which a cut is formed from the side of a thermoplastic resin layer being an innermost layer and a base film is laminated on the thermoplastic resin layer, and processing in which, after a cut reaching a thermoplastic resin layer is formed from a side of an intermediate layer, a base film is laminated on the intermediate layer (see, for example, Patent Literature 1).

CITATION LIST

Patent Literature

Patent Literature 1: JP 2012-46231 A

SUMMARY OF INVENTION

Technical Problem

However, if a half-cutting process as mentioned above is applied, depending on the depth of the cut, high cutability along a straight line and good openability are obtained, but the strength of the film is relatively low. When the strength of the film is low, in some instances, contents in the pouch formed of this film may possibly leak at the time when the pouch is filled with the contents or transported after the pouch is filled with contents, for example. Furthermore, in a pouch formed of films formed with a cut in a barrier layer, the barrier properties may possibly decrease.

The present invention is to solve the problems described above, and an object thereof is to provide a film and a pouch having basic characteristics such as a strength and barrier properties and achieving good openability.

Solution to Problem

A film according to the present invention is a film including at least a sealant layer. The film is formed with a cut guide line, and the cut guide line includes an impression formed in at least one surface of the sealant layer.

A pouch according to the present invention is a pouch in which the films are superimposed in a state where the sealant layers face each other, and peripheral edge parts are heat-sealed. The cut guide line is placed extending across at least a position where heat seal is not performed.

Advantageous Effects of Invention

A film according to the present invention includes a cut guide line including an impression formed in a sealant layer. Therefore, according to the film in the present invention, no cut is formed in the sealant layer, and thus, basic characteristics such as a strength and barrier properties are obtained. Furthermore, since a cutting direction is guided by the impression, good openability is obtained, and the film can be cut along the cut guide line with a small opening force.

In a pouch according to the present invention, the films are superimposed in a state where the sealant layers face each other, and thus, good openability is obtained when the pouch is opened along the cut guide line, and the pouch can be cut along the cut guide line with a small opening force while basic characteristics such as a strength and barrier properties are maintained.

DESCRIPTION OF EMBODIMENTS

Figure 1:
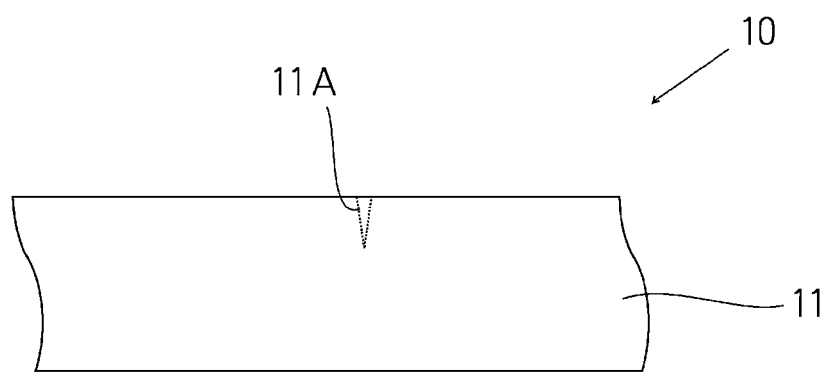
FIG. 1 is an explanatory cross-sectional view illustrating an example of a configuration of a film according to a first embodiment of the present invention.
Figure 2:
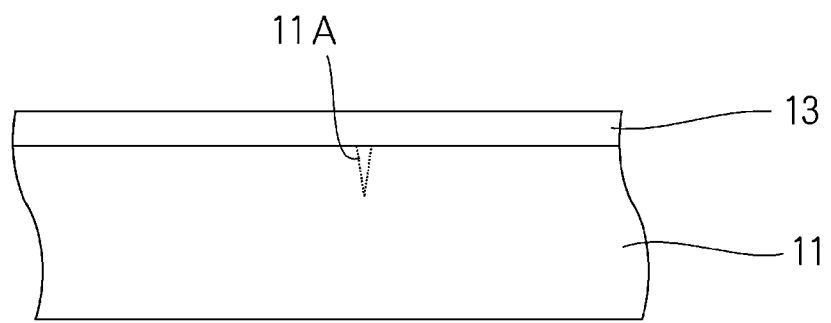
FIG. 2 is an explanatory cross-sectional view illustrating another example of a configuration of the film according to the first embodiment of the present invention.
Figure 3:
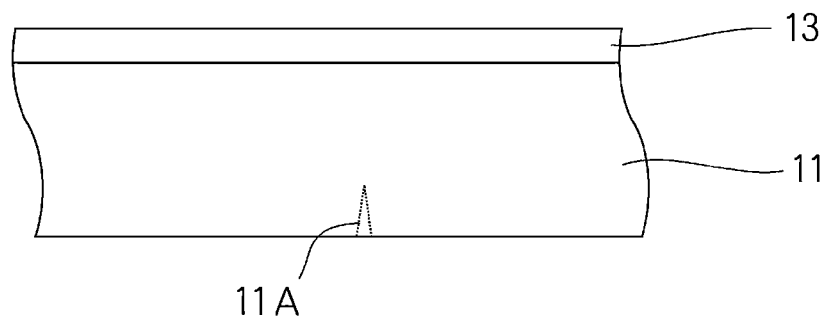
FIG. 3 is an explanatory cross-sectional view illustrating yet another example of a configuration of the film according to the first embodiment of the present invention.
Figure 4:
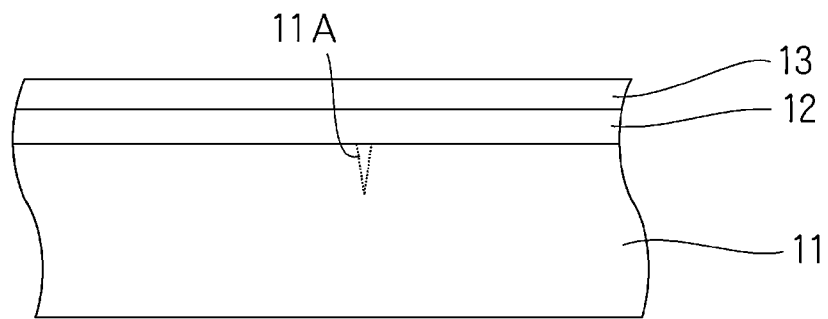
FIG. 4 is an explanatory cross-sectional view illustrating yet another example of the configuration of the film according to the first embodiment of the present invention.
Figure 5:
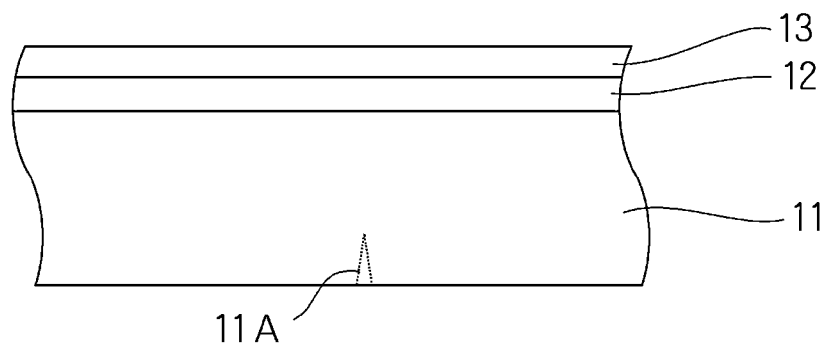
FIG. 5 is an explanatory cross-sectional view illustrating yet another example of a configuration of the film according to the first embodiment of the present invention.

The present invention will be described in detail below.
Film According to First Embodiment
A film 10 according to a first embodiment of the present invention includes a sealant layer 11. Specifically, as illustrated in FIG. 1, the film 10 may be a resin film formed only of the sealant layer 11. Furthermore, the film 10 may be formed of a stacked film in which another layer is stacked on at least one surface of the sealant layer 11. Specifically, as illustrated in FIGS. 2 and 3, the film 10 may be formed of a stacked film in which the sealant layer 11 and a surface layer 13 are stacked in this order, or as illustrated in FIGS. 4 and 5, the film 10 may be formed of a stacked film in which the sealant layer 11, an intermediate layer 12, and the surface layer 13 are stacked in this order.

A cut guide line G is formed in the film 10.

The cut guide line G includes a substantially groove-shaped impression 11A formed in the surface of the sealant layer 11 and extending in one direction. The impression 11A is not a cut, but a distortion caused due to plastic deformation generated when pressure is applied in a thickness direction from the surface of the sealant layer 11, and is formed only in a part on the surface side in a thickness direction of the sealant layer 11. Specifically, when a general material employed for a sealant layer of a pouch is employed, the impression 11A is preferably formed from the surface of the sealant layer 11 with a depth up to 20% or greater of a thickness, for example. When the impression 11A is formed from the surface of the sealant layer 11 with a depth less than 20% of the thickness, the cut guide line G does not have sufficient guide ability and good openability may not be obtained.

In the present invention, the impression 11A formed in the sealant layer 11, that is, the distortion caused due to plastic deformation refers to a region where interference fringes are visually recognizable when the cross section of the film 10 is observed with a polarizing microscope.

The cut guide line G, that is, the impression 11A of the film 10 according to the first embodiment is only required to have such a width that the film 10 can be torn by hand along the cut guide line G.

The shape of the cut guide line G is not limited to a straight line and may be a curved line or a bent line. Furthermore, the cut guide line G may not have a continuous linear shape. For example, the cut guide line G may be formed intermittently in a broken line on a virtual straight line.

When the film 10 is formed of a stacked film, the impression 11A of the sealant layer 11 may be formed in a top surface of the sealant layer 11 on a side where another layer (the surface layer 13 or the intermediate layer 12) is stacked, as illustrated in FIGS. 2 and 4, or may be formed in a bottom surface of the sealant layer 11 on a side opposite to the side where the other layer (the surface layer 13 or the intermediate layer 12) is stacked, as illustrated in FIGS. 3 and 5.

Figure 6:
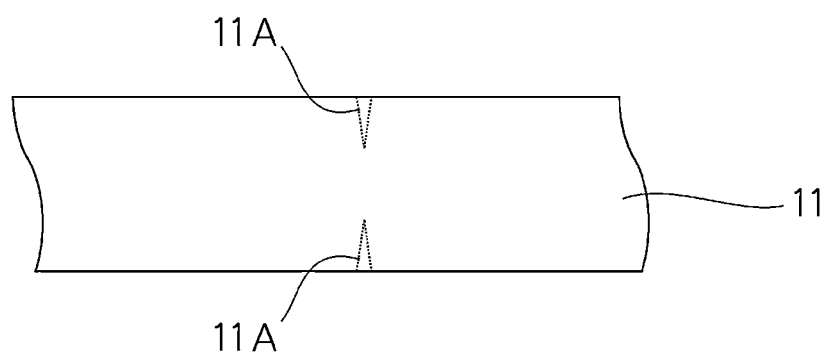
FIG. 6 is an explanatory cross-sectional view illustrating yet another example of a configuration of the film according to the first embodiment of the present invention.

As illustrated in FIG. 6, in the configuration of the cut guide line G formed in the film 10, the impression 11A may be formed in both the surfaces of the sealant layer 11. That is, the impression 11A constituting the cut guide line G may be formed in the top surface of the sealant layer 11 and may also be formed in the bottom surface of the sealant layer 11. In the sealant layer 11, the impressions 11A and 11A in both the surfaces of the sealant layer 11 extend in parallel to each other and are separated from each other in a vertical direction with an inner region of the sealant layer 11 therebetween, in any cross section perpendicular to the sealant layer 11.

Furthermore, another layer such as the intermediate layer 12 or the surface layer 13 may be stacked on one of the surfaces of the sealant layer 11 in which the impressions 11A are formed in both the surfaces.

A plurality of the cut guide lines G, for example, two to six of the cut guide lines G are provided extending in parallel on the same surface, for example.

Since the plurality of cut guide lines G are provided in parallel, even in a case where positions of the films 10 shift to a certain extent from desired positions along a direction perpendicular to the cut guide lines G when two of the films 10 are superimposed to manufacture a pouch 30, a state where the cut guide lines G face each other can be obtained, and thus, the permissible range of accuracy required for superimposing the two films 10 is large, and as a result, the pouch 30 can be manufactured with an industrial advantage.

Sealant Layer

The sealant layer 11 is formed of, for example, a heat-sealable thermoplastic resin, and is formed of a plastically deformable material in which an impression can be formed in a pressing process described later. Various well-known materials may be employed for the material forming the sealant layer 11, and specifically, the sealant layer 11 preferably includes a film formed of polyolefin resins such as a low-density polyethylene resin, a medium-density polyethylene resin, a high-density polyethylene resin, a linear low-density polyethylene resin, and a polypropylene resin, or polyester resins such as amorphous polyethylene terephthalate.

Furthermore, the sealant layer 11 may have a multi-layer structure. When the film 10 including the sealant layer 11 having a multi-layer structure is used, and top surfaces including the impression 11A are brought into contact with each other and heat-sealed to form the pouch 30, it is only required that a layer on a top surface side where the impression 11A is to be formed is formed of a heat-sealable thermoplastic resin having plastic deformability. Alternatively, when the surfaces (bottom surfaces) on the side opposite to the top surfaces including the impression 11A are brought into contact with each other and heat-sealed to form the pouch 30, it is only required that a layer on a top surface side where the impression 11A is to be formed is formed of a plastically deformable material and that a layer on the furthermost side of the layer on the top surface side is formed of a heat-sealable thermoplastic resin.

The thickness of the sealant layer 11 is, for example, from 20 µm to 150 µm.

Intermediate Layer

When the film 10 includes the intermediate layer 12, various well-known materials may be employed for the material forming the intermediate layer 12. For example, the intermediate layer 12 is formed of biaxially oriented resin films formed of a polyester resin such as a polyethylene terephthalate resin (PET), a polybutylene terephthalate resin (PBT), a polyethylene naphthalate resin (PEN), and an ethylene terephthalate/isophthalate copolymer resin, a film containing a vapor-deposited film in which a vapor-deposited film including a metal oxide such as alumina or silicon oxide is formed on these resin films, a coating barrier film formed with a coating film layer formed of a resin coating agent having barrier properties including a polycarboxylic acid polymer, vinylidene chloride, an ethylene vinyl alcohol copolymer, or the like, a resin film formed of a resin having barrier properties such as a nylon resin, an ethylene-vinyl alcohol copolymer resin, and a cyclic olefin copolymer, and metal foils such as an aluminum foil.

Surface Layer

The surface layer 13 is provided to protect the sealant layer 11 or the intermediate layer 12. Although not illustrated in FIGS. 2 to 5, an adhesive layer including an adhesive may be interposed between the sealant layer 11 and the intermediate layer 12 and/or between the intermediate layer 12 and the surface layer 13.

Various well-known materials may be employed for the material forming the surface layer 13, and the surface layer 13 may be formed of the resin films and the like mentioned above as the material of the intermediate layer 12, for example.

Method of Manufacturing Film According to First Embodiment

The film 10 according to the first embodiment described above can be manufactured by using, as a film to be processed, a single-layer film serving as the sealant layer 11 and forming the cut guide line G by the impression 11A formed by applying a pressing process to the sealant layer 11. When the intermediate layer 12 and the surface layer 13 are stacked on the sealant layer 11, after a pressing process is applied to the film to be processed, the intermediate layer 12 or the surface layer 13 may be provided by, for example, laminating the intermediate layer 12 or the surface layer 13 and the one surface of the sealant layer 11 formed with the impression 11A, or the other surface of the sealant layer 11 not formed with the impression 11A.

In one example of a pressing process, while the film to be processed is caused to travel in one direction, a processing roll including an abutting circumferential part configured to abut against the surface of the film to be processed and a pressing tool provided protruding from the abutting circumferential part toward the outer circumference, is pressed from the top surface side of the film to be processed, so that a part on the top surface side of the sealant layer 11 is plastically deformed to form the impression 11A, and thus, the cut guide line G can be formed.

When a plurality of the cut guide lines G are simultaneously formed in the film 10, a processing roll including a plurality of the pressing tools in parallel may be employed, or a plurality of the processing rolls may be simultaneously employed.

The pressing depth of the pressing tool for the film to be processed is determined in accordance with processing conditions such as a protruding amount of the pressing tool protruding from the abutting circumferential part of the processing roll and a pressing force of the processing roll onto the film to be processed. However, it is only required to adjust the pressing depth to such a depth that the impression 11A can be formed to a desired depth in the sealant layer 11.

Furthermore, when the cut guide line G is formed intermittently in a broken line on a virtual straight line, the pressing tool of the processing roll described above may be a member having a zigzag shape or a wave shape, instead of a member having a circumferential shape parallel to the traveling direction of the film to be processed.

According to the film 10 of the first embodiment as described above, since the film 10 includes the cut guide line G formed by the impression 11A formed in the sealant layer 11, a cutting direction is guided by the impression 11A, so that good openability can be obtained, and thus, the film 10 can be cut along the cut guide line G with a small opening force. Furthermore, no cut is formed in the sealant layer 11, and thus, the strength does not decrease and a desired strength can be maintained.

Possible reasons why good openability can be obtained by providing the impression 11A formed in the sealant layer 11 are as follows. First, it is assumed that the impression 11A is present only on the top surface side of the sealant layer 11 in the thickness direction, that is, a distortion caused due to plastic deformation is mostly present on the top surface side (and/or the bottom surface side) and no distortion due to plastic deformation is present on an inner part of the sealant layer 11. When a tearing force is applied to an end part of the cut guide line G in the sealant layer 11, it is assumed that since the distortion due to the plastic deformation forming the impression 11A at the top surface side is fragile, the distortion tears first when a force is applied; subsequent to the tearing of the distortion, the entire portion at the inner part (and at the bottom surface side) where the distortion due to the plastic deformation is not present is torn in the thickness direction; this process occurs continuously along the cut guide line G, and thus; the film 10 can be cut with high accuracy along the cut guide line G. Furthermore, it is assumed that since the distortion due to the plastic deformation is fragile, the film 10 can be cut by applying a small force.

Film According to Second Embodiment

Figure 7:
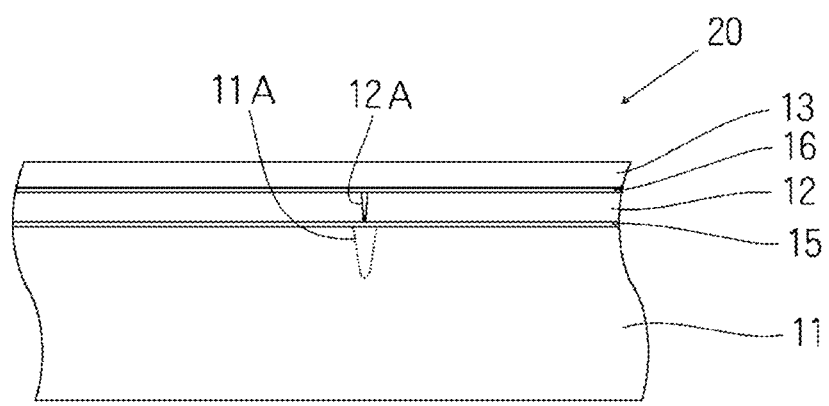
FIG. 7 is an explanatory cross-sectional view illustrating an example of a configuration of a film according to a second embodiment of the present invention.

As illustrated in FIG. 7, a film 20 according to a second embodiment of the present invention is formed of a stacked film in which at least the intermediate layer 12 and the surface layer 13 are stacked in this order on the top surface of the sealant layer 11, and has a configuration similar to that of the film 10 according to the first embodiment, except that the cut guide line G includes the impression 11A of the sealant layer 11 and a cut 12A formed in the intermediate layer 12 directly above the impression 11A.

In the film 20 according to the present embodiment, an adhesive layer 15 formed of a well-known adhesive, for example, is interposed between the sealant layer 11 and the intermediate layer 12. Furthermore, an adhesive layer 16 formed of a well-known adhesive, for example, is interposed between the intermediate layer 12 and the surface layer 13. Since the adhesive layer 15 and the adhesive layer 16 formed of an adhesive are interposed between the sealant layer 11 and the intermediate layer 12 and between the intermediate layer 12 and the surface layer 13, respectively, the respective layers reliably adhere to each other, and thus, sealing properties of the pouch 30 can be obtained when the pouch 30 is formed (see FIG. 9A).

The cut guide line G of the film 20 according to the second embodiment includes the impression 11A formed in the top surface of the sealant layer 11 and the cut 12A formed in the intermediate layer 12 directly above the impression 11A. In other words, the cut guide line G includes the cut 12A and the impression 11A. The cut 12A is formed in the intermediate layer 12 so that the entire intermediate layer 12 is cut in the thickness direction, and the impression 11A is formed in the sealant layer 11 directly below the cut 12A. The sealant layer 11 includes the impression 11A at a position immediately below the cut 12A of the intermediate layer 12, but is not cut.

The cut guide line G is only required to have such a width that the film 20 can be torn by hand along the cut guide line G.

The shape of the cut guide line G is not limited to a straight line, and may be a curved line or a bent line. Furthermore, the cut guide line G may not have a continuous linear shape. For example, the cut guide line G may be formed intermittently in a broken line on a virtual straight line.

A plurality of the cut guide lines G, for example, two to six of the cut guide lines G are provided extending in parallel on the same surface, for example.

Since the plurality of cut guide lines G are provided in parallel, even in a case where positions of the films 20 shift to a certain extent from desired positions along a direction perpendicular to the cut guide lines G when two of the films 20 are superimposed to manufacture the pouch 30, a state where the cut guide lines G face each other can be obtained, and thus, the permissible range of accuracy required for superimposing the two films 10 is large, and as a result, the pouch 30 can be manufactured with an industrial advantage.

Figure 8:
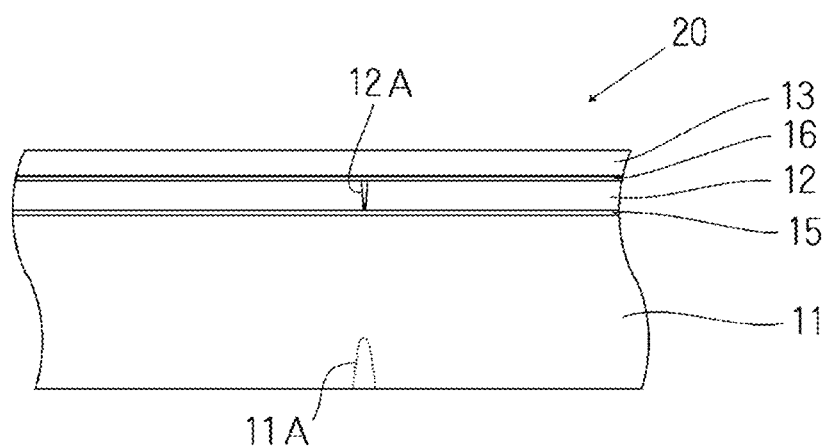
FIG. 8 is an explanatory cross-sectional view illustrating another example of a configuration of the film according to the second embodiment of the present invention.

Furthermore, as illustrated in FIG. 8, in the film 20, the impression 11A of the sealant layer 11 constituting the cut guide line G may be formed in the bottom surface opposite to the top surface of the sealant layer 11 on which the intermediate layer 12 is stacked. In the film 20, the impression 11A of the sealant layer 11 and the cut 12A of the intermediate layer 12 extend in parallel to each other and are separated from each other in the vertical direction with an inner region and a top surface side region of the sealant layer 11 therebetween, in any cross section perpendicular to the film 20.

Furthermore, in the film 20, the impression 11A constituting the cut guide line G may be formed in the top surface of the sealant layer 11 on which the intermediate layer 12 is stacked, and may also be formed in the bottom surface of the sealant layer 11. In the film 20, the impressions 11A and 11A in both surfaces of the sealant layer 11 and the cut 12A of the intermediate layer 12 extend in parallel to each other and are separated from each other in the vertical direction, in any cross section perpendicular to the film 20.

Sealant Layer

The sealant layer 11 forming the film 20 according to the second embodiment of the present invention is formed of, for example, a heat-sealable thermoplastic resin, and is formed of a plastically deformable material in which an impression is formed at the same process as a cutting process described later under conditions of cutting the intermediate layer 12.

A material similar to the material of the sealant layer 11 of the film 10 according to the first embodiment may be employed for the material for forming the sealant layer 11 of the second embodiment.

Furthermore, the sealant layer 11 may have a multi-layer structure. In this case, it is only required that a layer adjacent to the intermediate layer 12 is formed of a plastically deformable material and the furthermost layer from the layer adjacent to the intermediate layer 12 is formed of a heat-sealable thermoplastic resin.

The thickness of the sealant layer 11 is, for example, from 20 μm to 150 μm.

Intermediate Layer

A material similar to the material of the intermediate layer 12 of the film 10 according to the first embodiment may be employed for the material for forming the intermediate layer 12 of the second embodiment.

Surface Layer

A surface layer similar to the surface layer 13 of the film 10 according to the first embodiment may be employed for the surface layer 13 of the second embodiment.

Method of Manufacturing Film According to Second Embodiment

The film 20 described above can be manufactured by using, as a film to be processed, a stacked film in which the sealant layer 11 and the intermediate layer 12 are stacked with the adhesive layer 15 interposed therebetween, forming the cut guide line G by applying a cutting process to the stacked film, for example, and then, disposing the surface layer 13 on the intermediate layer 12 by laminating or the like.

The cut guide line G of the film 20 can be formed by a cutting process using a manufacturing apparatus disclosed in JP 2018-86695 A. Specifically, while the film to be processed including the stacked film in which the sealant layer 11 and the intermediate layer 12 are stacked is caused to travel in one direction, a processing roll is pressed against the film from the side of the intermediate layer 12 of the film to be processed. The processing roll includes an abutting circumferential part configured to abut against the surface of the film to be processed, and a cutting blade protruding from the abutting circumferential part toward the outer circumference is provided on the abutting circumferential part. Thus, the entire intermediate layer 12 is cut in the thickness direction, and the sealant layer 11 is plastically deformed to form the impression 11A, and therefore, the cut guide line G can be formed.

When a plurality of the cut guide lines G are simultaneously formed in the film 20, a processing roll including a plurality of the cutting blades in parallel may be employed, or a plurality of the processing rolls may be simultaneously employed.

The depth to which the film to be processed is cut is determined in accordance with processing conditions such as a protruding amount of the cutting blade protruding from the abutting circumferential part of the processing roll and a pressing force of the processing roll onto the film to be processed. However, it is only required to adjust the cutting depth to such a depth that the cut 12A can be formed by cutting the entire intermediate layer 12 in the thickness direction and the sealant layer 11 is not cut while the impression 11A is formed in the sealant layer 11.

Furthermore, when the cut guide line G is formed intermittently in a broken line on a virtual straight line, the cutting blade of the processing roll described above may be a blade having a zigzag shape or a wave shape, instead of a blade having a circumferential shape parallel to the traveling direction of the film to be processed.

Furthermore, the film 20 in which the impression 11A of the sealant layer 11 constituting the cut guide line G is formed in the bottom surface opposite to the top surface on which the intermediate layer 12 including the cut 12A is stacked, can be manufactured as follows. A single-layer film serving as the sealant layer 11 is employed for a film to be processed and is subjected to the pressing process described above, for example, to form the impression 11A. Meanwhile, a single-layer film serving as the intermediate layer 12 is employed for a film to be processed and is subjected to the cutting process described above to form the cut 12A. The impression 11A of the sealant layer 11 and the cut 12A of the intermediate layer 12 are aligned to each other, and then, the intermediate layer 12 is disposed by laminating or the like on the top surface of the sealant layer 11.

According to the film 20 of the second embodiment as described above, since the film 20 includes the cut guide line G including the impression 11A formed in the sealant layer 11 and the cut 12A formed in the intermediate layer 12, the cutting direction is guided by the impression 11A and the cut 12A, so that good openability can be obtained, and the film 20 can be cut along the cut guide line G with a small opening force. Furthermore, no cut is formed in the sealant layer 11, and thus, the strength does not decrease and a desired strength can be maintained.

Possible reasons why good openability can be obtained by providing the cut guide line G including the impression 11A formed in the sealant layer 11 and the cut 12A formed in the intermediate layer 12 are as follows. First, the cut 12A cutting the entire intermediate layer 12 in the thickness direction is formed in the intermediate layer 12, and thus, the cut 12A functions as a guide when a tearing force is applied along the cut guide line G, so that good openability can be obtained. Furthermore, it is assumed that the impression 11A is present only on the top surface side of the sealant layer 11 in the thickness direction, that is, a distortion due to plastic deformation is mostly present on the top surface side (and/or the bottom surface side) and no distortion due to plastic deformation is present on an inner part of the sealant layer 11. When a tearing force is applied to an end part of the cut guide line G of the film 20, it is assumed that since the distortion due to the plastic deformation forming the impression 11A at the top surface side is fragile, the distortion tears first when a force is applied; subsequent to the tearing of the distortion, the entire portion at the inner part (and at the bottom surface side) where the distortion due to the plastic deformation is not present is torn in the thickness direction; this process occurs continuously along the cut guide line G; and thus, the film 20 can be cut with high accuracy along the cut guide line G. Furthermore, it is assumed that since the distortion due to the plastic deformation is fragile, the film 10 can be cut by applying a small force.

Pouch

Figure 9A:
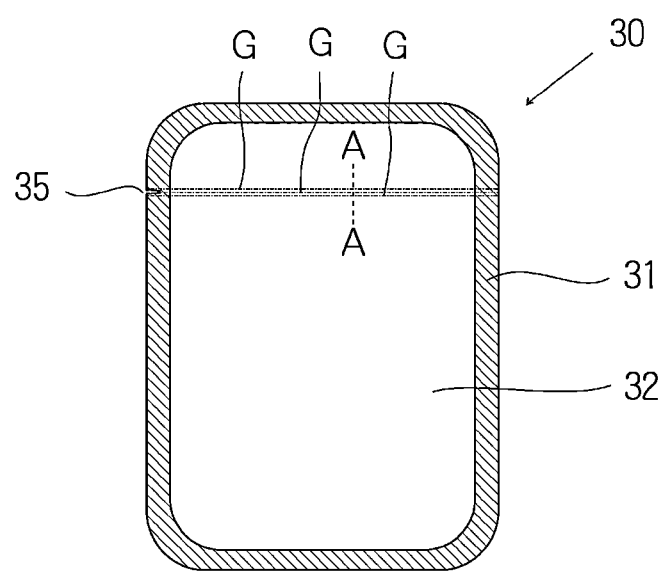
FIG. 9A is an explanatory plan view illustrating an example of a configuration of a pouch according to the present invention.

As illustrated in FIG. 9A, in the pouch 30 according to one embodiment of the present invention, the films 10 (or the films 20) described above are superimposed so that the sealant layers 11 face each other, and peripheral edge parts are heat-sealed, and as a result, a heat-sealed part 31 formed by the heat-sealed peripheral edge parts and a non-heat sealed part 32 in which the sealant layers 11 are not heat-sealed and face each other are formed. The cut guide line G of the film 10 (the film 20) is placed extending across at least the non-heat sealed part 32.

Figure 9B:
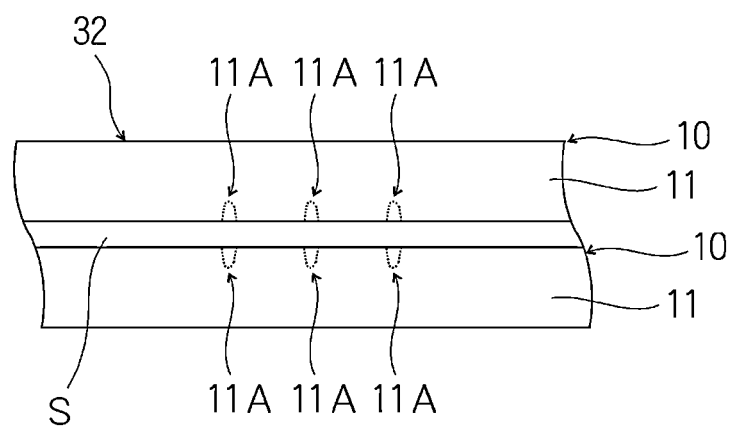
FIG. 9B is a cross-sectional view taken along line A-A in FIG. 9A.
Figure 10:
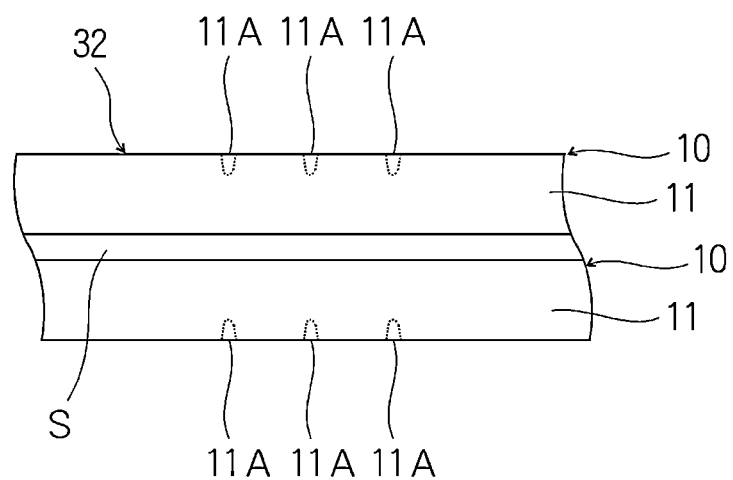
FIG. 10 is a cross-sectional view of a non-heat sealed part in another example of a configuration of the pouch according to the present invention.
Figure 11:
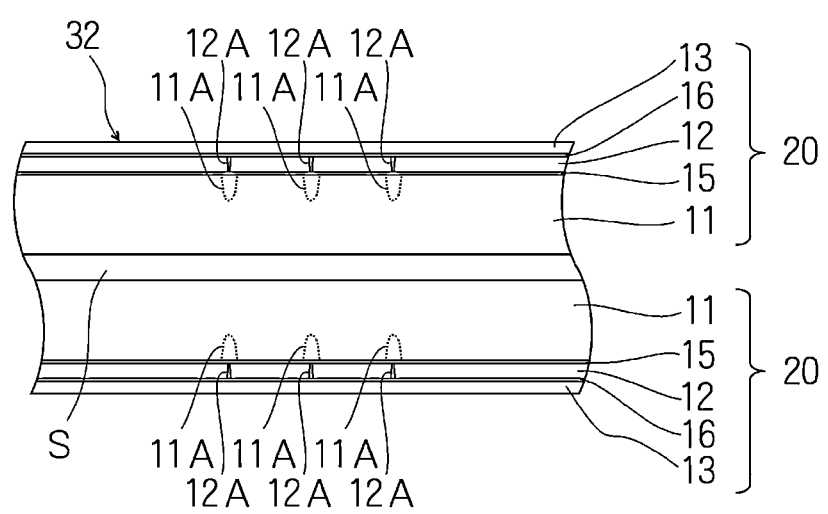
FIG. 11 is a cross-sectional view of a non-heat sealed part in yet another example of a configuration of the pouch according to the present invention.

When the top and bottom films 10 to be superimposed include only the sealant layer 11, the films 10 may be superimposed so that the top surfaces in which the impression 11A of the sealant layer 11 is formed face each other with an inner space S of the pouch 30 interposed therebetween, as illustrated in FIG. 9B, or the films 10 may be superimposed so that the bottom surfaces opposite to the top surface where the impression 11A of the sealant layer 11 is formed face each other, as illustrated in FIG. 10. Furthermore, the top surface of one of the films 10 and the bottom surface of the other one of the films 10 may be superimposed so as to face each other. Moreover, when the films 10 (the films 20) in which the intermediate layer 12 and the surface layer 13 are stacked on the sealant layer 11 are superimposed, the films 10 (the films 20) are superimposed so that the sealant layers 11 face each other. At this time, depending on the layer structure of the film 10 (the film 20), the impressions 11A formed in the bottom surface (innermost surface) of the sealant layers 11 may face each other, or the bottom surfaces not formed with the impressions 11A of the sealant layer 11 may face each other. FIG. 11 is a cross-sectional view of a non-heat sealed part in a pouch formed by superimposing the films 20 in which the intermediate layer 12 and the surface layer 13 are stacked in this order on the sealant layer 11 and the cut 12A is formed in the intermediate layer 12.

Furthermore, a configuration of the pouch 30 is not limited to a configuration in which two of the films 10 (the films 20) having the same layer structure are superimposed, and as long as the films are superimposed so that the sealant layers 11 face each other, films having different layer structures may be superimposed to form the pouch 30.

The top and bottom films 10 (films 20) superimposed are placed such that the cut guide lines G face each other.

Specifically, the films 10 (the films 20) are preferably placed such that the cut guide lines G face each other in a state where the error range (shift) in a direction perpendicular to the cut guide lines G is 1.5 mm or less, for example. When the shift between the superimposed films 10 (films 20) is 1.5 mm or less, a state is obtained in which the cut guide lines G face each other in a way that desired openability can be obtained. Furthermore, when a plurality of the cut guide lines G are formed, a state is obtained in which one of the cut guide lines G in one of the films 10 (the films 20) faces any one of the plurality of cut guide lines G in the other one of the films 10 (the films 20) so that openability can be obtained.

Note that, in FIG. 9A, reference numeral 35 denotes a notch with a tip part formed on a virtual line obtained by substantially extending the cut guide line G.

The cut guide line G may or may not be present in the heat-sealed part 31 in which two of the films 10 (or the films 20) are superimposed and peripheral edge parts are heat-sealed. However, cutting is usually started from the heat-sealed part 31, and thus, the cut guide line G is preferably placed such that the cut guide line G also extends in the heat-sealed part 31 on an extension line of the cut guide line G placed extending across the non-heat sealed part 32. In a case where the cut guide line G is present in the heat-sealed part 31, better openability is obtained than that of the other heat-sealed parts 31.

When a force for tearing the pouch 30 is applied from the notch 35 of the heat-sealed part 31, the cut guide line G of each of the films 10 and 10 (the films 20 and 20) forming the non-heat sealed part 32 is torn, and the pouch 30 is cut from the tip part of the notch 35, the cutting in the top and bottom films 10 and 10 (films 20 and 20) proceeds along the cut guide lines G and G, and the pouch 30 is opened.

The pouch 30 in the present invention can be applied to various types of pouch shapes such as a flat bag-type pouch (see FIG. 9A), a gusset-type pouch, a standing pouch, and a pillow-type pouch.

A film and a pouch according to the embodiment in the present invention have been described above. However, the present invention is not limited to the above embodiment, and various modifications are possible.

For example, a configuration of each of the films 10 and 20 is not limited to the layer structure described above, and may be a configuration in which another layer is interposed.

EXAMPLES

Specific examples of the present invention will be described below, but the present invention is not limited thereto.

Example 1

The sealant layer 11 formed of a cast polypropylene film (CPP) having a thickness of 70 μm was prepared for the film to be processed. A film [1] was manufactured as follows. While being caused to travel, the film to be processed was subjected to a pressing process in which a processing roll including a pressing tool was pressed against the film from a surface side of the film under the conditions below, and the cut guide line G constituted by the impression 11A was formed.

Conditions of Processing Roll (Pressing Tool) in Pressing Process

Figure 12:
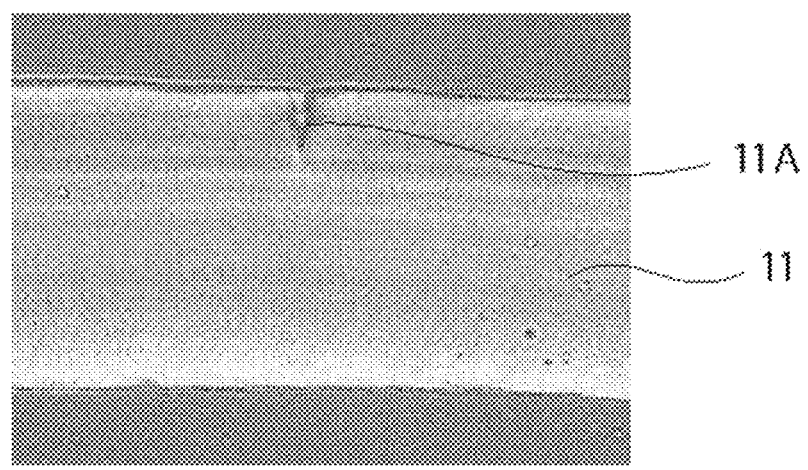
FIG. 12 is a polarized photomicrograph of a cross section of a film [1] obtained after a cutting process according to Example 1.

Thickness of end part of pressing tool: 3 μm
Number of pressing tools: 1
Protruding height of pressing tool from outer peripheral surface of abutting circumferential part (height of pressing tool): 40 μm A polarized photomicrograph of a cross section of the film [1] that was subjected to a pressing process was taken and it was seen that the impression 11A was formed while the sealant layer 11 was uncut. Furthermore, it was seen that the impression 11A was formed from the surface of the sealant layer 11 with a depth up to 23% of the thickness. A polarized photomicrograph of a cross section of the film [1] that was subjected to a pressing process is illustrated in FIG. 12.

Example 2

Figure 13:
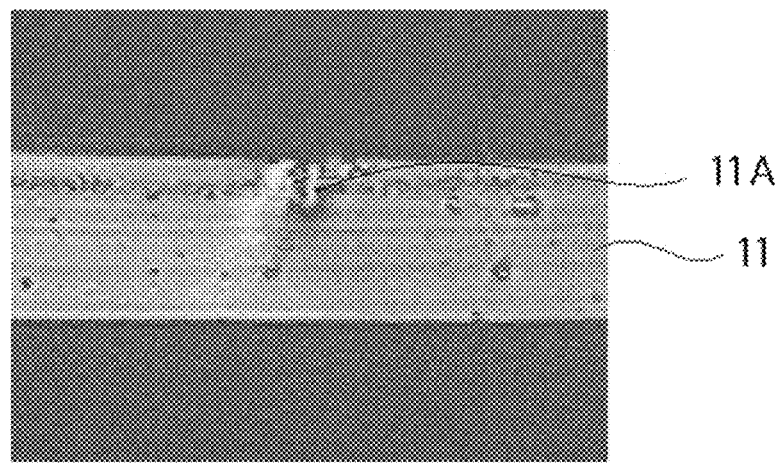
FIG. 13 is a polarized photomicrograph of a cross section of a film [2] obtained after a cutting process according to Example 2.

A film [2] was manufactured in much the same way as Example 1, except that an amorphous polyethylene terephthalate film (PET) having a thickness of 70 μm was employed for the film to be processed, instead of the cast polypropylene film (CPP). A polarized photomicrograph of a cross section of the film [2] that was subjected to a pressing process was taken and it was seen that the impression 11A was formed while the sealant layer 11 was uncut. Furthermore, it was seen that the impression 11A was formed from the surface of the sealant layer 11 with a depth up to 36% of the thickness. A polarized photomicrograph of a cross section of the film [2] that was subjected to a pressing process is illustrated in FIG. 13.

Comparative Example 1

A film [3] was manufactured in much the same way as Example 1, except that a fold was formed by applying a pressing load to the film to be processed (the sealant layer 11) of Example 1 in a folded state to form a cut guide line constituted by the fold. A polarized photomicrograph of a cross section of the film [3] in which the fold was formed was taken and it was seen that the fold was formed in the sealant layer 11. Furthermore, it was seen that the fold was formed across the sealant layer 11 in a thickness direction thereof.

Both sides of the cut guide line at an end part of the films [1] to [3] were grasped with both hands, respectively, and one side thereof was pulled to the bottom surface side and the other side thereof was pulled to the top surface side to tear and cut the films [1] to [3] by hand along the cut guide line. The openability at this time was evaluated according to the evaluation criteria below.

Evaluation Criteria of Openability

A: Film could be opened straight along cut guide line by small force

C: Film could not be opened due to elasticity

TABLE 1

|  | Example 1 | Example 2 | Comparative Example 1 |
|---|---|---|---|
| Film No. | [1] | [2] | [3] |
| Material of sealant layer | CPP | PET | CPP |
| Cut guide line | Impression | Impression | Fold |
| Formation range of impression | 23% | 36% | — |
| Evaluation result Openability | A | A | C |

As can be understood from Table 1, it was seen that according to the films [1] and [2] in the present invention, the film could be opened straight along the cut guide line with a small force, and good openability could be obtained.

On the other hand, it was seen that the film where the fold was formed instead of the impression, as in the film [3] according to Comparative Example 1, could not be opened due to elasticity.

Example 3

A nylon film having a thickness of 15 μm was prepared for the intermediate layer 12. Furthermore, a cast polypropylene film (CPP) having a thickness of 70 μm was prepared for the sealant layer 11. The intermediate layer 12 and the sealant layer 11 were stacked by dry laminating using a urethane-based adhesive (3 μm) to manufacture a film to be processed formed of a two-layer film. While being caused to travel, the film to be processed was subjected to the cutting process by pressing a processing roll from the side of the intermediate layer under the conditions below, to form the cut guide line G having a linear shape.

Subsequently, a biaxially oriented polyethylene terephthalate (PET) film serving as a surface layer having a thickness of 12 μm was stacked by dry laminating using a urethane-based adhesive (3 μm) on the intermediate layer 12 of the film to be processed that was subjected to a cutting process, and thus, a film [4] was manufactured. Next, a pouch [1] was manufactured as follows. Two of the films [4] that were cut such that each film has a size of 130 mm wide and 170 mm long and the cut guide line G extends transversely at a distance of 20 mm from an upper end of the film were prepared. These two films [4] were superimposed such that the sealant layers 11 face each other and the cut guide lines G face each other, and peripheral edge parts of the films [4] were heat-sealed on three sides. Subsequently, the pouch was filled with 200 g of water as a content, the peripheral edge part on the remaining side was then heat-sealed, and a notch was formed in the heat-sealed part on an extension line of the cut guide line G.

Figure 14:
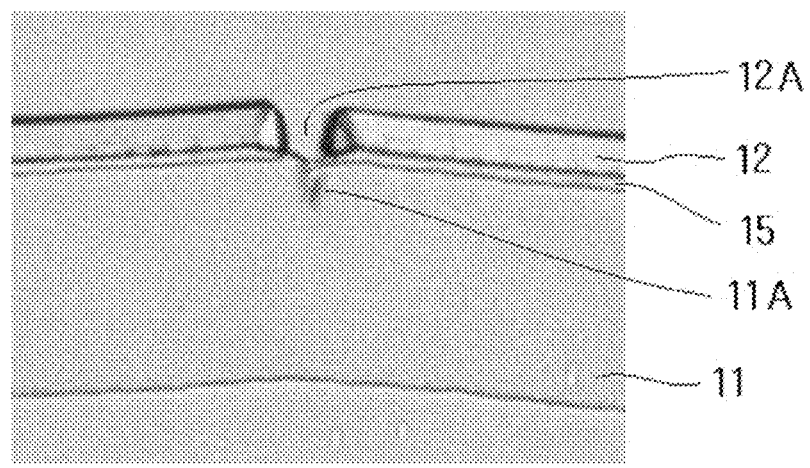
FIG. 14 is a polarized photomicrograph of a cross section of a film to be processed obtained after a cutting process according to Example 3.
Figure 15:
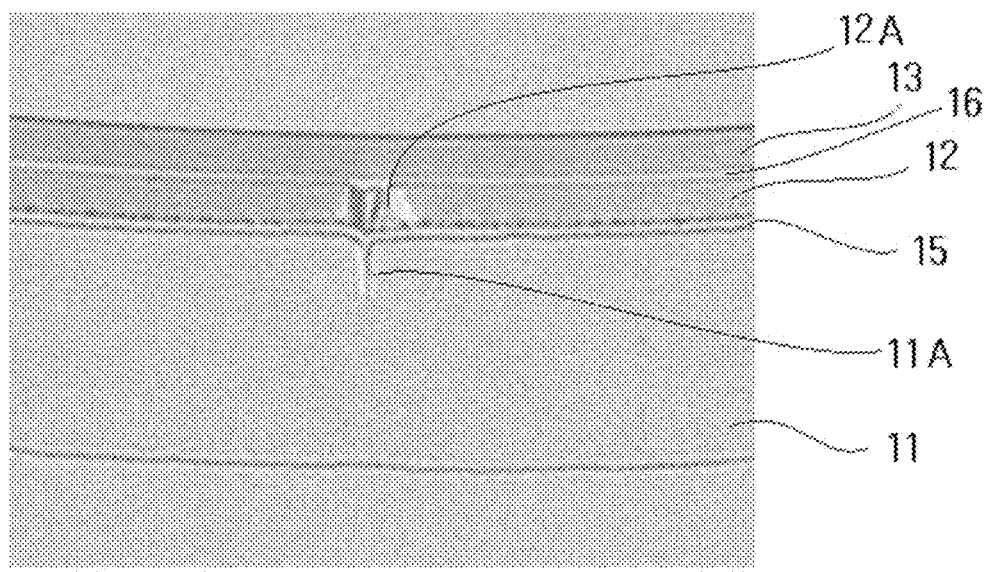
FIG. 15 is a polarized photomicrograph of a cross section of a film [4] according to Example 3.

Conditions of Processing Roll in Cutting Process
Thickness of cutting blade: 1 mm
Angle of blade edge of cutting blade: 30 degrees
Protruding height (height of blade) of cutting blade from outer peripheral surface of abutting circumferential part: 40 μm Polarized photomicrographs of a cross section of the film to be processed that was subjected to a cutting process and a cross section of the film [4] were taken, and it was seen that the entire intermediate layer 12 was cut in the thickness direction, and thus, the cut 12A was formed, and the impression 11A was formed in the sealant layer 11. The polarized photomicrographs of the cross section of the film to be processed that was subjected to a cutting process and the cross section of the film [4] are illustrated in FIGS. 14 and 15, respectively.

Example 4

A nylon film having a thickness of 15 μm was prepared for the intermediate layer 12. Meanwhile, the sealant layer 11 formed of a cast polypropylene film (CPP) having a thickness of 70 μm was prepared for a film to be processed. While being caused to travel, the film to be processed was subjected to a pressing process in which a processing roll including a pressing tool was pressed against the film from a surface side of the film under the same conditions as in Example 1, and the cut guide line G constituted by the impression 11A having a liner shape was formed.

The intermediate layer 12 described above was stacked, by dry laminating using a urethane-based adhesive (3 μm), on a top surface formed with the cut guide line G of the sealant layer 11 in which the cut guide line G was formed.

Subsequently, a biaxially oriented polyethylene terephthalate (PET) film serving as a surface layer having a thickness of 12 μm was stacked by dry laminating using a urethane-based adhesive (3 μm) on the intermediate layer 12, and as a result, a film [5] was manufactured. Subsequently, a pouch [2] was manufactured as follows. Two of the films [5] that were cut such that each film has a size of 130 mm wide and 170 mm long, and the cut guide line G extends transversely at a distance of 20 mm from an upper end of the film were prepared. These two films [5] were superimposed such that the sealant layers 11 face each other and the cut guide lines G face each other, and peripheral edge parts of the films [5] were heat-sealed on three sides. Subsequently, the pouch was filled with 200 g of water as a content, the peripheral edge part on the remaining side was then heat-sealed, and a notch was formed in the heat-sealed part on an extension line of the cut guide line G.

Comparative Example 2

A film [6] was manufactured in much the same way as Example 3, except that the blade height of the processing roll and the pressing force on the film to be processed were adjusted to cut the entire intermediate layer in the thickness direction and partially cut the sealant layer to form a cut, and a pouch [3] was further manufactured.

Comparative Example 3

A film [7] was manufactured in much the same way as Example 3, except that the film to be processed was not subjected to a cutting process, and a pouch [4] was further manufactured.

Both sides of the cut guide line at an end part of the films [4] to [7] were grasped with both hands, respectively, and one side thereof was pulled to the bottom surface side and the other side thereof was pulled to the top surface side to tear and cut the films [4] to [7] by hand along the cut guide line. The openability at this time was evaluated according to the evaluation criteria below. Furthermore, a strength test was conducted in which the pouches [1] to [4] filled with water were dropped onto a floor surface five times from a height of 1.0 m in a state where a guide processing part (an upper end part including the cut guide line) faced downward, to evaluate the drop strength according to the evaluation criteria below. The results are shown in Table 2.

Evaluation Criteria of Openability
A: Pouch could be opened straight by small force
B: Pouch could be opened straight
C: Shift occurred between top and bottom surfaces and pouch could not be opened straight Evaluation Criteria of Drop Strength
A: Pouch did not break
B: Bending was seen in cut guide line part, but pouch did not break
C: Cut guide line part was torn and pouch broken

TABLE 2

| | | Example 3 | Example 4 | Comparative Example 2 | Comparative Example 3 |
|---|---|---|---|---|---|
| Film No. | | [4] | [5] | [6] | [7] |
| Pouch No. | | [1] | [2] | [3] | [4] |
| Cut guide line | Cut in intermediate layer | Yes | No | Yes | No |
| | Impression in sealant layer | Yes | Yes | No (Cut) | No |
| Evaluation result | Openability | A | B | A | C |
| | Drop strength | B | A | C | A |

As can be understood from Table 2, it was seen that, according to the films [4] and [5] in the present invention, while sufficient drop strength was obtained, the film could be opened straight along the cut guide line, and thus, good openability was obtained.

On the other hand, in a case where the intermediate layer was cut to such a depth that the entire intermediate layer was cut and a part of the sealant layer was simultaneously cut, as in the film [6] according to Comparative Example 2, it was seen that the pouch [3] could be opened straight along the cut guide line, but the pouch [3] had a lower drop strength than those of the pouches [1] and [2] according to the Examples, and thus, the cut guide line part was torn and the pouch [3] was broken. Furthermore, in a case where the intermediate layer did not include a cut and the sealant layer did not include an impression and a cut, as in the film [7] according to Comparative Example 3, it was seen that a drop strength was obtained, but shift occurred between the top and bottom parts of the pouch and the pouch could not be opened straight.

REFERENCE SIGNS LIST 10, 20 Film
11 Sealant layer
11A Impression
12 Intermediate layer
12A Cut
13 Surface layer
15 Adhesive layer
16 Adhesive layer
30 Pouch
31 Heat-sealed part
32 Non-heat sealed part
35 Notch
G Cut guide line
S Inner space

The invention claimed is:
1. A film comprising:
a sealant layer;
at least an intermediate layer and a surface layer stacked in this order on the surface of the sealant layer; and
a cut guide line, the cut guide line being an impression formed in a surface of the sealant layer without cutting the sealant layer, wherein
the impression is formed in the surface of the sealant layer on a side of the sealant layer where the intermediate layer is stacked,
a cut is formed in the intermediate layer, and
the cut is positioned directly above the impression.

2. The film according to claim 1, wherein
a thickness of the sealant layer is from 20 μm to 150 μm, and
the impression is formed from the surface with a depth up to 20% or greater of the thickness.

3. The film according to claim 1, wherein a plurality of the cut guide lines are provided.

4. The film according to claim 1, wherein the sealant layer is formed of a polypropylene resin or amorphous polyethylene terephthalate.

5. A pouch comprising a first film and a second film,
wherein each of the first film and the second film includes:
   a sealant layer;
   at least an intermediate layer and a surface layer stacked in this order on the surface of the sealant layer; and
   a cut guide line, the cut guide line being an impression formed in a surface of the sealant layer without cutting the sealant layer, wherein the impression is formed in the surface of the sealant layer on a side of the sealant layer where the intermediate layer is stacked, a cut is formed in the intermediate layer, and the cut is positioned directly above the impression, wherein the sealant layer of the first film faces and the sealant layer of the second film, and a peripheral edge part of the sealant layer of the first film is heat-sealed to a peripheral edge part of the sealant layer of the second film, and wherein the cut guide line of the first film and the cut guide line of the second film extend parallel to each other across a position respectively on the sealant layer of the first film and on the sealant layer of the second film that are not heat-sealed.

* * * * *